(12) United States Patent
Kasahara

(10) Patent No.: US 10,953,866 B2
(45) Date of Patent: Mar. 23, 2021

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

(\*) Notice: Subject to any disclaimer, the term of this patent is extended or adjusted under 35 U.S.C. 154(b) by 183 days.

(21) Appl. No.: 16/353,961

(22) Filed: Mar. 14, 2019

(65) Prior Publication Data

US 2019/0291717 A1    Sep. 26, 2019

(30) Foreign Application Priority Data

Mar. 23, 2018 (JP) .............................. JP2018-055600

(51) Int. Cl.
| | | |
|---|---|---|
| *B60W 20/40* | (2016.01) | |
| *B60W 10/02* | (2006.01) | |
| *B60W 10/06* | (2006.01) | |
| *B60W 10/08* | (2006.01) | |
| *B60W 10/11* | (2012.01) | |

(Continued)

(52) U.S. Cl.
CPC .............. *B60W 20/40* (2013.01); *B60K 6/365* (2013.01); *B60K 6/442* (2013.01); *B60W 10/02* (2013.01); *B60W 10/06* (2013.01); *B60W 10/08* (2013.01); *B60W 10/115* (2013.01); *B60W 2510/0638* (2013.01); *B60W 2510/083* (2013.01); *B60W 2530/18* (2013.01); *B60W 2710/021* (2013.01); *B60W 2710/025* (2013.01); *B60W 2710/1005* (2013.01); *B60Y 2200/92* (2013.01)

(58) Field of Classification Search
CPC ...... B60W 20/40; B60W 10/02; B60W 10/06; B60W 10/08; B60W 10/115; B60W 2510/0638; B60W 2510/083; B60W 2530/18; B60W 2710/021; B60W 2710/025; B60W 2710/1005; B60W 2520/10; B60W 30/1846; B60W 20/10; B60W 20/14; B60W 30/18127; B60W 30/182; B60K 6/442; B60K 6/365; B60K 6/383; B60K 2006/381; B60K 6/387; B60K 6/445; B60K 6/26; B60Y 2200/92; Y02T 10/62
See application file for complete search history.

(56) References Cited

U.S. PATENT DOCUMENTS

2014/0194238 A1\* 7/2014 Ono ........................ B60K 6/365
475/5

FOREIGN PATENT DOCUMENTS

CN          201810691 U  \*  4/2011
WO       2013014777 A1      1/2013

\* cited by examiner

*Primary Examiner* — Rodney A Butler
(74) *Attorney, Agent, or Firm* — Duft & Bornsen, PC

(57) ABSTRACT

A drive system of a hybrid vehicle including an internal combustion engine, a first motor-generator, a second motor-generator, a planetary gear mechanism provided in a power transmission path, a clutch mechanism engaging or disengaging a sun gear and ring gear of the planetary gear mechanism, and a microprocessor controlling the clutch mechanism. The microprocessor is configured to determine whether it is necessary to perform a meshing position shifting control for shifting meshing positions of the sun gear and the planetary gear and of the planetary gear and the ring gear, and temporarily disengage the clutch mechanism so as to shift the meshing positions when it is determined that it is necessary to perform the meshing position shifting control while the clutch mechanism is engaged.

7 Claims, 13 Drawing Sheets

(51) Int. Cl.
*B60K 6/44* (2007.10)
*B60K 6/36* (2007.10)
*B60W 10/115* (2012.01)
*B60K 6/442* (2007.10)
*B60K 6/365* (2007.10)

|  |  | BR | CL | OWY | ENG |
|---|---|---|---|---|---|
| EV MODE | | × | × | × | × |
| W MOTOR MODE | | × | ○ | ○ | × |
| SERIES MODE | | ○ | ○ | × | ○ |
| HV MODE | LOW | × | ○ | ○ | ○ |
|  | HIGH | ○ | × | ○ | ○ |

EV MODE

W MOTOR MODE

SERIES MODE

HV LOW MODE

HV HIGH MODE

HYBRID VEHICLE DRIVE SYSTEM

CROSS-REFERENCE TO RELATED APPLICATION

This application is based upon and claims the benefit of priority from Japanese Patent Application No. 2018-055600 filed on Mar. 23, 2018, the content of which is incorporated herein by reference.

BACKGROUND OF THE INVENTION

Field of the Invention

This invention relates to a drive system of a hybrid vehicle including a speed change mechanism.

Description of the Related Art

Conventionally, there is a known apparatus of this type that includes an engine and a pair of rotating electrical machines, wherein motive power from the engine is divided by a first planetary gear mechanism to a first rotating electrical machine and a second planetary gear mechanism side, and an associated vehicle is adapted to travel under motive power output through the second planetary gear mechanism and motive power of the second rotating electrical machine. Such a unit is described in, for example, International Publication No. 2013/014777 (WO2013/014777A). The apparatus described in WO2013/014777A includes a clutch and a brake connected to the second planetary gear mechanism, and drive mode is switched in response to engaging actions of the clutch and brake.

In an apparatus of this type, torque is transmitted through a planetary gear mechanism having a sun gear, planetary gears and a ring gear, and depending on drive mode, meshing zones of the sun gear and planetary gears and meshing zones of the planetary gears and ring gear sometimes remain static. When driving is continued with gear meshing zones (meshing positions) remaining fixed in this way, durability of the apparatus cannot be ensured because gear fatigue strength is degraded by continuous action of torque on particular gear teeth.

SUMMARY OF THE INVENTION

An aspect of the present invention is a drive system of a hybrid vehicle including: an internal combustion engine; a first motor-generator; a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a planetary gear mechanism provided in the first power transmission path and including a sun gear, a planetary gear and a ring gear; a clutch mechanism configured to integrally join or separate the sun gear and the ring gear by engaging or disengaging in accordance with an instruction of a drive mode; and an electronic control unit including a microprocessor and a memory. The microprocessor is configured to perform determining whether it is necessary to perform a meshing position shifting control shifting a first meshing position of the sun gear and the planetary gear and a second meshing position of the planetary gear and the ring gear, controlling the clutch mechanism in accordance with the instruction of the drive mode, and the controlling including temporarily disengaging the clutch mechanism so as to shift the first meshing position and the second meshing position, when it is determined that it is necessary to perform the meshing position shifting control while the clutch mechanism is engaged under an instruction of a predetermined drive mode.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
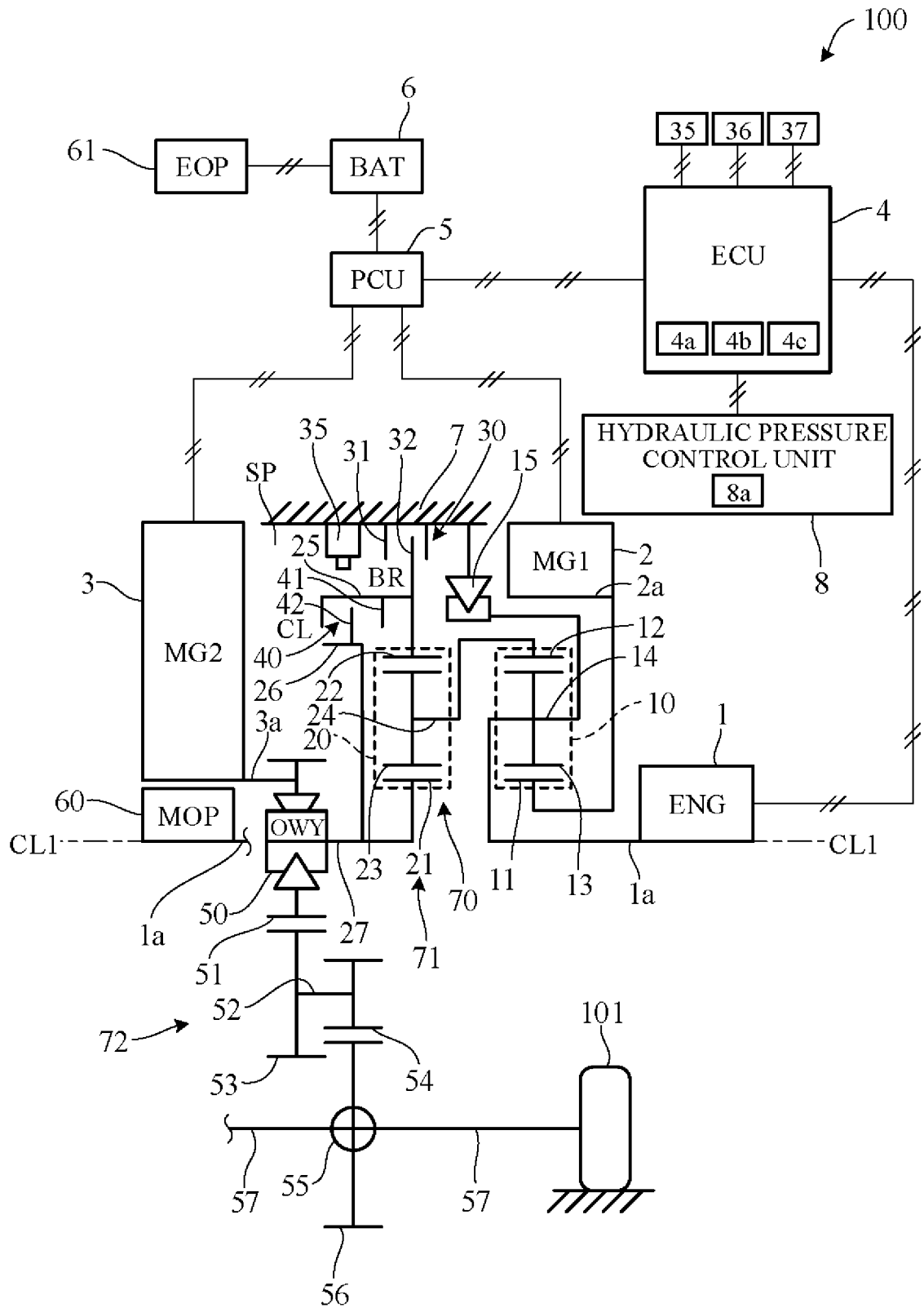
FIG. 1 is a diagram showing schematically a configuration overview of a drive system of a hybrid vehicle according to an embodiment of the invention.

Hereinafter, an embodiment of the present invention is explained with reference to FIGS. 1 to 15. A drive system according to an embodiment of the present invention is applied to a hybrid vehicle including an engine and a motor-generator as a drive power source. FIG. 1 is a diagram showing schematically a configuration overview of a drive system 100 of a hybrid vehicle according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 of single pinion type are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first planetary gears 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second planetary gears 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction. In other words, the brake mechanism 30 includes plates 31 and disks 32 as a plurality of friction engagement elements.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30. The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. In other words, the clutch mechanism 40 includes plates 41 and disks 42 as a plurality of friction engagement elements.

The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3*a* of the rotor of the second motor-generator 3 is connected to the output gear 51, so that the output gear 51 and the second motor-generator 3 (rotating shaft 3*a*) rotate integrally. Since the one-way clutch 50 is interposed between the output shaft 27 and the rotating shaft 3*a*, forward relative rotation of the rotating shaft 3*a* with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3*a*. Since axial length of the drive system 100 can therefore be minimized, a smaller drive system 100 can be realized.

A mechanical oil pump (MOP) 60 is installed radially inward of the rotor of the second motor-generator 3. The mechanical oil pump 60 is connected to the output shaft 1*a* of the engine 1 and driven by the engine 1. Oil supply necessary when the engine 1 is stopped is covered by driving an electric oil pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3*a*, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The hydraulic pressure control unit 8 includes electromagnetic valve, proportional electromagnetic valve, and other control valves (control valve 8*a*) actuated in accordance with electric signals. The control valve 8*a* operates to control hydraulic pressure flow to the brake mechanism 30, clutch mechanism 40 and the like in accordance with instructions from the controller 4. More specifically, the control valve 8*a* controls hydraulic oil flow to an oil chamber facing piston of the brake mechanism 30 and to an oil chamber facing piston of the clutch mechanism 40. This enables ON-OFF switching of the brake mechanism 30 and clutch mechanism 40. Hydraulic oil flow to the other portion is controlled by other control valve.

The controller (ECU) 4 as an electronic control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, and an accelerator opening angle sensor 37 for detecting accelerator opening angle indicative of amount of accelerator pedal depression. Although not indicated in the drawings, the controller 4 also receives signals from a sensor for detecting rotational speed of the engine 1, a sensor for detecting rotational speed of the first motor-generator 2 and a sensor for detecting rotational speed of the second motor-generator 3.

The controller 4 includes a mode instruction unit for deciding and instructing a drive mode in accordance with a predefined driving force map representing vehicle driving force characteristics defined in terms of factors such as vehicle speed and accelerator opening angle, based on input signals from these sensors. In order to enable the vehicle to travel in the drive mode instructed from the mode instruction unit, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

Figures 2, 3:
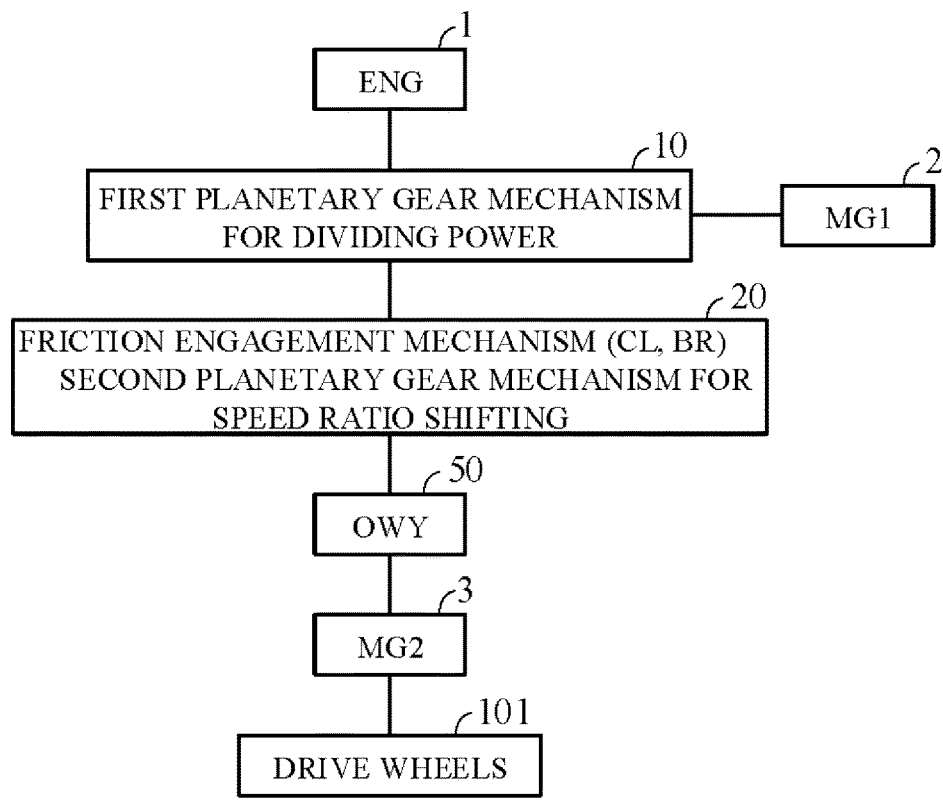
FIG. 2 is a diagram showing an interconnection of main components of the drive system of the hybrid vehicle according to the embodiment of the invention.
FIG. 3 is a diagram an example of drive modes implemented by the drive system of the hybrid vehicle according to the embodiment of the invention.

FIG. 2 is a drawing summarizing interconnection of main components of the drive system 100. As shown in FIG. 2, the first planetary gear mechanism 10 for dividing engine power is connected to the engine 1. The first motor-generator 2 and second planetary gear mechanism 20 for speed ratio shifting are connected to the first planetary gear mechanism 10. The second motor-generator 3 is connected through the one-way clutch 50 to the second planetary gear mechanism 20, and the front wheels 101 are connected to the second motor-generator 3 as drive wheels.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "○", while brake mechanism 30 OFF (Disengaged), clutch mechanism 40 OFF (Disengaged), one-way clutch 50 Unlocked, and engine 1 Stopped are indicated by symbol "x".

Figure 4:
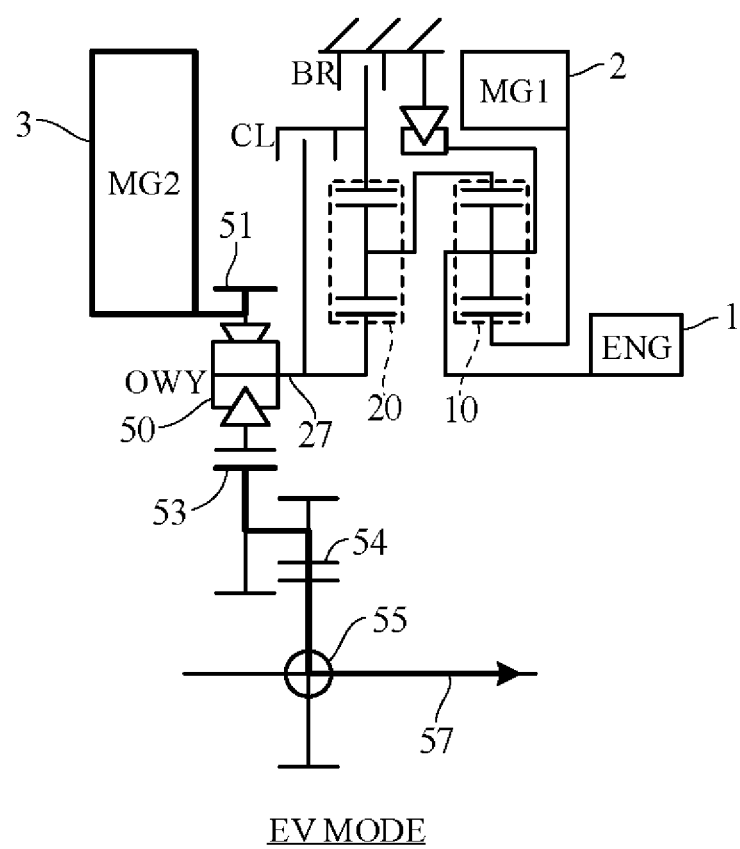
FIG. 4 is a skeleton diagram showing a flow of torque transmission in EV mode in the drive system of FIG. 1.

In EV mode, the vehicle is driven for traveling solely by motive power of the second motor-generator 3. As shown in FIG. 3, in EV mode, the brake mechanism 30 and clutch mechanism 40 are both OFF, and the engine 1 is stopped, in accordance with instructions from the controller 4. FIG. 4 is a skeleton diagram showing flow of torque transmission in EV mode.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 5:
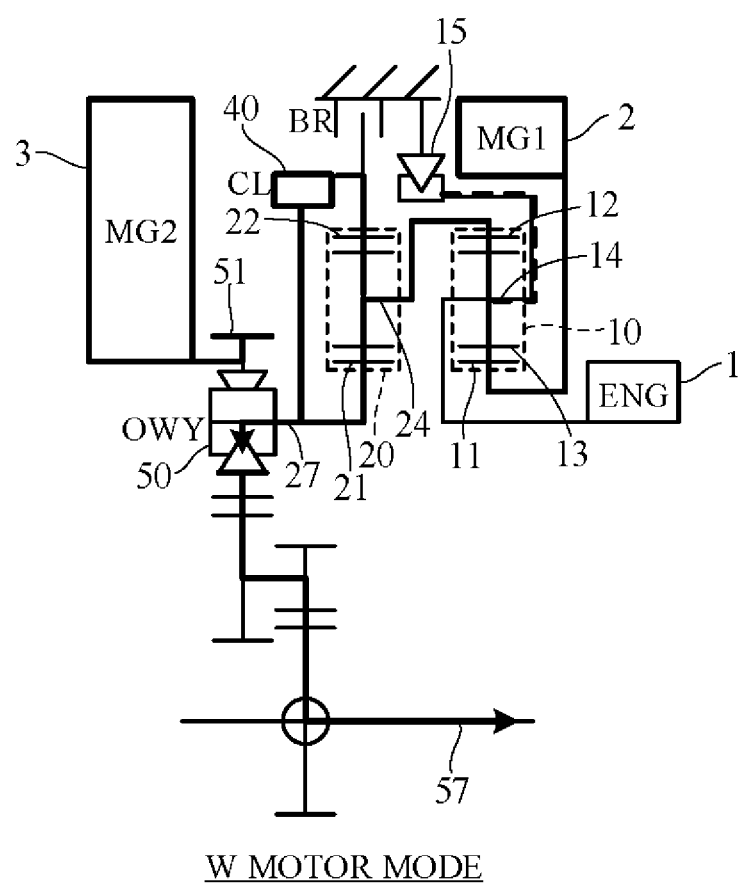
FIG. 5 is a skeleton diagram showing a flow of torque transmission in W motor mode in the drive system of FIG. 1.

In W motor mode, the vehicle is driven for traveling by motive power of the first motor-generator 2 and the second motor-generator 3. As shown in FIG. 3, in W motor mode, the brake mechanism 30 is OFF, the clutch mechanism 40 is ON and the engine 1 is stopped, in accordance with instructions from the controller 4. FIG. 5 is a skeleton diagram showing flow of torque transmission in W motor mode.

As show in FIG. 5, in W motor mode, rotation of the first carrier 14 is prevented by action of the one-way clutch 15, and torque output from the first motor-generator 2 is transmitted through the first sun gear 11, first planetary gears 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, propelling force can be increased to greater than in EV mode. In W motor mode, generating electric by the first motor-generator 2 is not implemented. Therefore, W motor mode is implemented when state of charge of the battery 6 (SOC) is greater than or equal to predetermined value.

Figure 6:
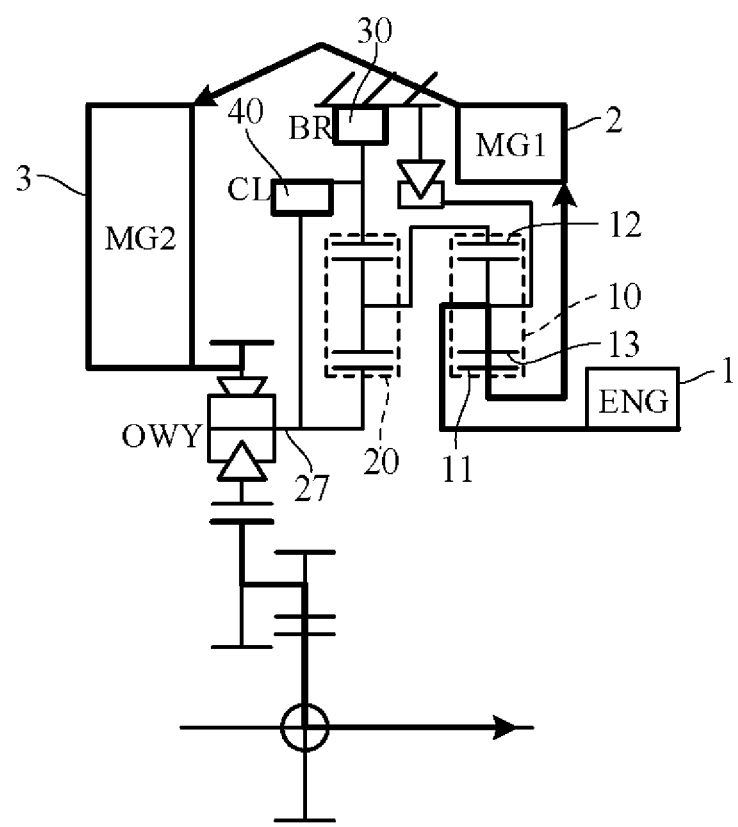
FIG. 6 is a skeleton diagram showing a flow of torque transmission in series mode in the drive system of FIG. 1.

In series mode, the vehicle is driven for traveling by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4. FIG. 6 is a skeleton diagram showing flow of torque transmission in series mode.

As shown in FIG. 6, in series mode, rotation from the first ring gear 12 to as far as the output shaft 27 is stopped, so that all power output from the engine 1 is input through the first planetary gears 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
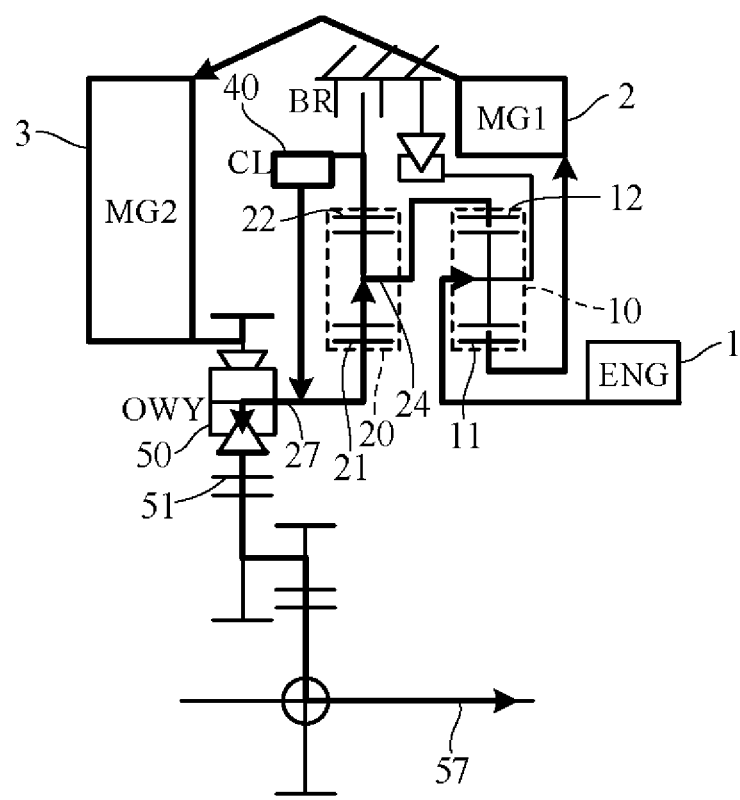
FIG. 7 is a skeleton diagram showing a flow of torque transmission in HV low mode in the drive system of FIG. 1.

FIG. 7 is a skeleton diagram showing flow of torque transmission in HV low mode. As shown in FIG. 7, in HV low mode, some torque output from the engine 1 is transmitted through the first sun gear 11 to the first motor-generator 2. As a result, the battery 6 is charged by power generated by the first motor-generator 2, and, in addition, driving electric power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
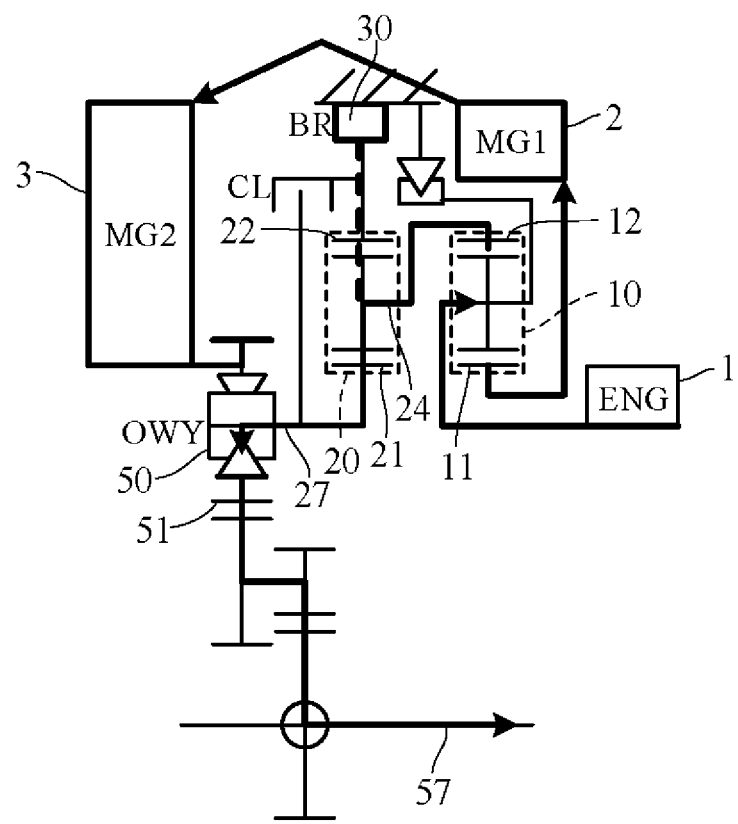
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 8, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

Figure 9:
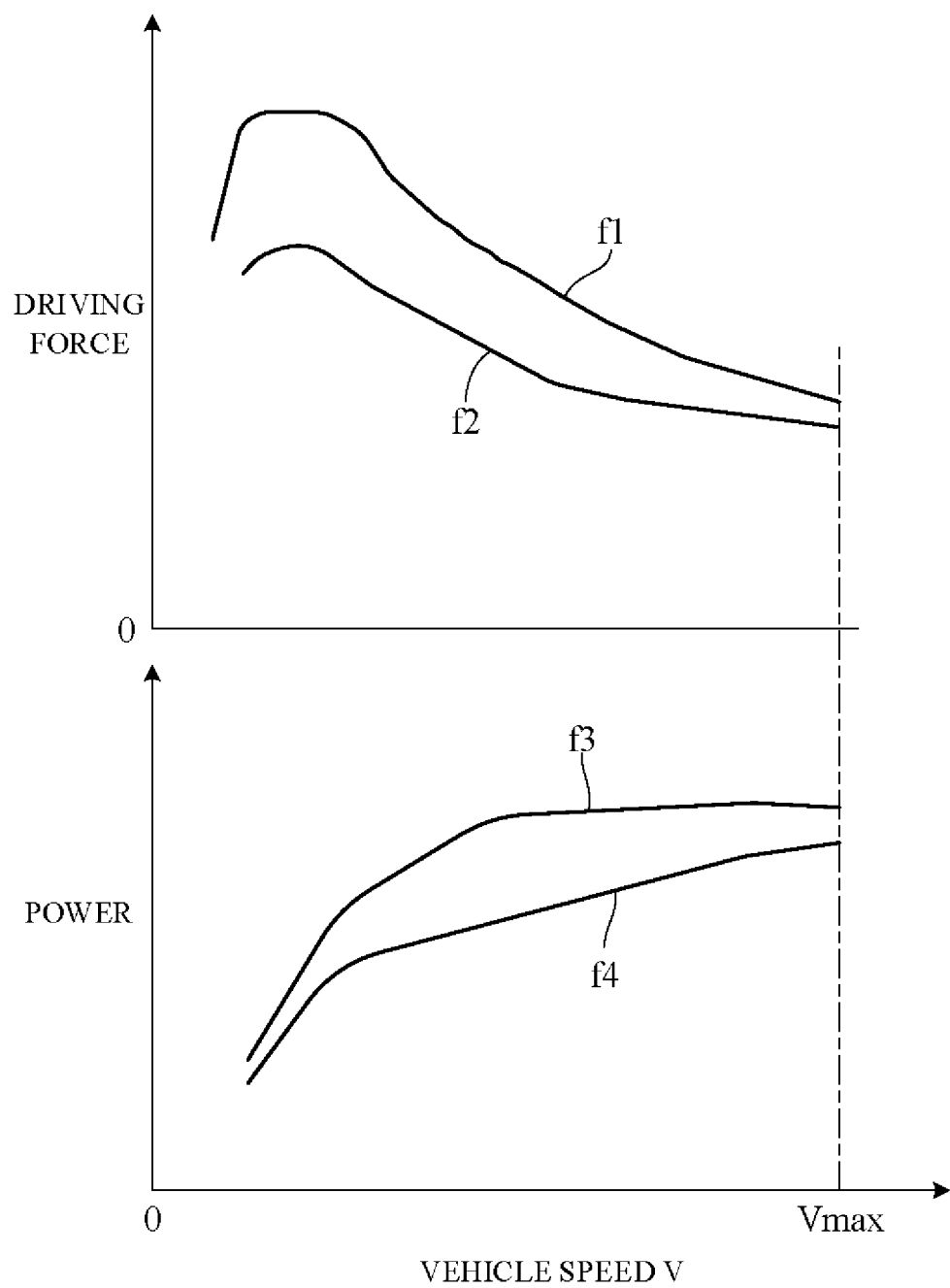
FIG. 9 is a diagram showing characteristic curves of driving force and power corresponding vehicle speed in HV low mode and HV high mode of the drive system of the hybrid vehicle according to the embodiment of the invention.

FIG. 9 is a diagram showing characteristic curves of driving force and power corresponding vehicle speed V during wide-open accelerator in HV low mode and HV high mode of the drive system 100 in accordance with the present embodiment. In the drawing, characteristic curves f1 and f3 represent HV low mode characteristics, and characteristic curves f2 and f4 represent HV high mode characteristics. As shown in FIG. 9, in the drive system 100 of the present embodiment, the driving force and power characteristic curves f1 to f4 can be obtained from low speed (e.g., vehicle speed 0) up to maximum vehicle speed Vmax in both HV low mode and HV high mode, thereby enabling HV low mode and HV high mode traveling over the full range of vehicle speed V.

Although not shown in the drawings, the drive system 100 can also implement drive modes other than the aforesaid, such as regeneration mode and engine braking mode. In regeneration mode, for example, both the brake mechanism 30 and the clutch mechanism 40 are turned OFF. As a result, the second motor-generator 3 is driven by torque from the axles 57 to produce regenerative electric power. In engine braking mode, the brake mechanism 30 and the clutch mechanism 40 are both turned ON. As a result, the second motor-generator 3 is driven by torque from the axles 57 to produce regenerative electric power that drives first motor-generator 2 accordingly. Since this applies motive power load to the engine 1, it causes an engine-braking-like pumping loss.

The controller 4 described in the foregoing is adapted to use a predefined driving force map to automatically decide drive mode in accordance with vehicle speed and required driving force. However, a driver may sometimes prefer driving that, for example, is better in power performance than in fuel economy performance. In such a case, the travel performance desired by the driver cannot be satisfied should drive mode frequently switch in response to vehicle speed and required driving force.

In the present embodiment, therefore, a configuration is adopted that enables the driver to select certain travel modes manually. Specifically, the present embodiment is adapted to allow the driver to select between normal mode and sport mode. When normal mode is selected, drive mode is automatically decided in accordance with vehicle speed and required driving force as described above. On the other hand, when sport mode is selected, HV low mode capable of producing high driving force is instructed at all times other than during deceleration at vehicle propelling force of 0 or less. As a result, the driver's desire to prioritize power performance can be satisfied.

A point requiring attention here is that drive mode always switches to HV low mode when sport mode is selected. As shown in FIG. 7, therefore, the second sun gear 21, second ring gear 22 and second planetary gears 23 are integrated owing to the clutch mechanism 40 being ON, and torque from the engine 1 is transmitted to the axles 57 in this state.

However, when the clutch mechanism 40 is ON, meshing positions of the gears 21 to 23 come to be fixed. Namely, as seen in a front view of the second planetary gear mechanism 20 shown in FIG. 10, meshing zones P1 of the second sun gear 21 and second planetary gears 23 and meshing zones P2 of the second planetary gears 23 and second ring gear 22 are fixed. Since torque therefore continuously acts on particular gear teeth of the gears 21 to 23, the gears 21 to 23 are apt to sustain loss of fatigue strength that degrades durability of the drive system 100. So in the present embodiment, durability impairment of the drive system 100 is minimized by adopting the configuration set out in the following.

Figure 11:
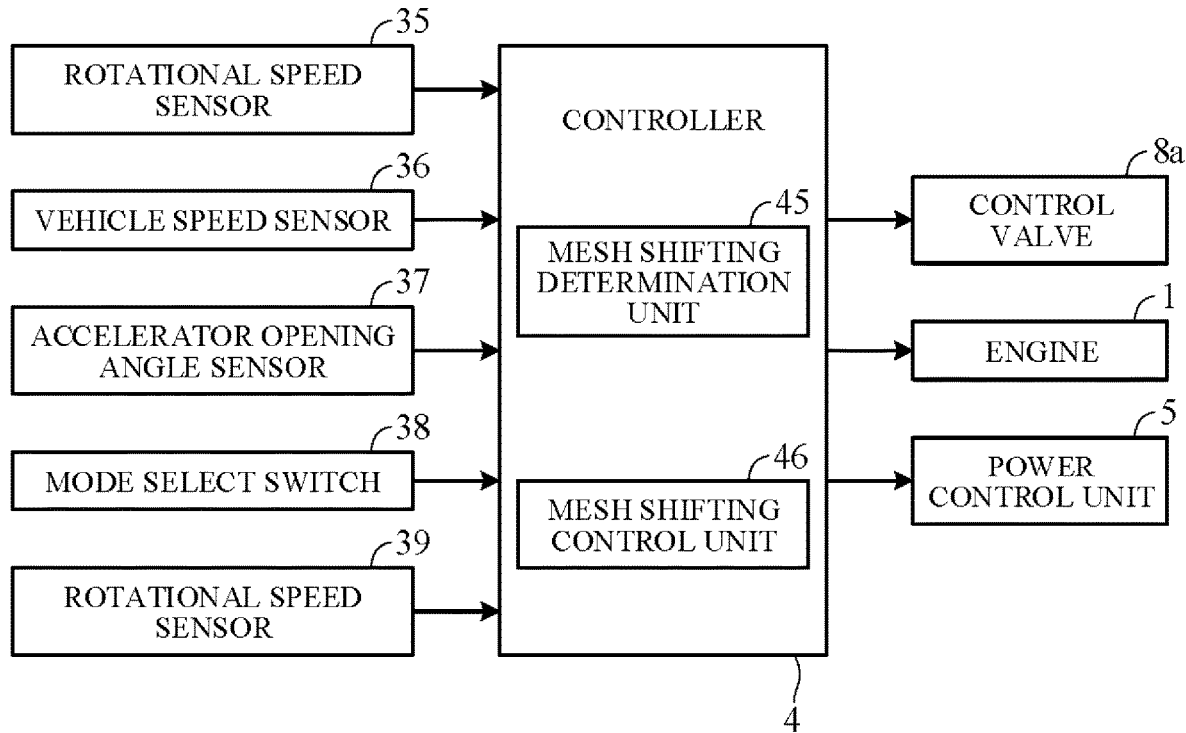
FIG. 11 is a block diagram showing main configurations of the drive system of the hybrid vehicle according to the embodiment of the invention.

FIG. 11 is a block diagram showing main components of the drive system 100 according to the present embodiment, with primary focus on a control configuration for shifting meshing positions of the gears 21 to 23 of the second planetary gear mechanism 20. As shown in FIG. 11, the controller 4 receives input signals from the rotational speed sensor 35, vehicle speed sensor 36 and accelerator opening angle sensor 37 shown in FIG. 1, and additionally receives input signals from a mode select switch 38 and a rotational speed sensor 39.

The mode select switch 38 is for switching to either normal mode or sport mode and is, for example, an operation member provided at a driver's seat to be switched by driver switching operation. The rotational speed sensor 39 is for detecting rotational speed of disks 42 of the clutch mechanism 40. Alternatively, the rotational speed sensor 39 can be one for detecting rotational speed of the second sun gear 21 or the output shaft 27, which rotate integrally with the disks 42. Since the rotational speed sensor 35 detects rotational speed of the plates 41 that rotate integrally with the outer drum 25, difference of rotational speed of the plates 41 and disks 42 (rotational speed difference) can be detected based on signals from the rotational speed sensor 35 and the rotational speed sensor 39.

As functional configurations, the controller 4 includes a mesh shifting determination unit 45 and a mesh shifting control unit 46. The mesh shifting determination unit 45 determines whether a meshing position shifting control is necessary. This determination is performed using reference characteristics stored in memory in advance.

Figure 12:
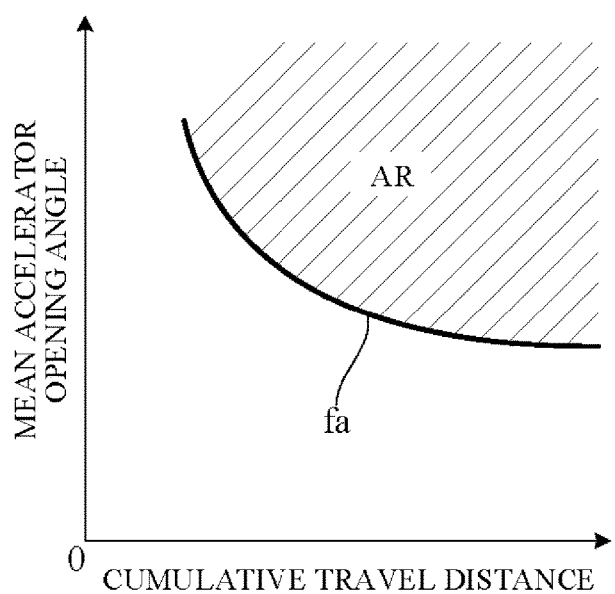
FIG. 12 is a diagram showing an example of a reference characteristic curve used in processing performed by a mash shifting determination unit of FIG. 11.

FIG. 12 is a diagram showing an example of a reference characteristic curve fa. Horizontal axis of FIG. 12 is scaled for cumulative value of travel distance after the clutch mechanism 40 has been turned ON. This value of cumulative travel distance is reset to 0 every time the clutch mechanism 40 is turned OFF. Vertical axis of FIG. 12 is scaled for mean value of accelerator opening angle after the clutch mechanism 40 has been turned ON. This mean value of accelerator opening angle is also reset to 0 every time the clutch mechanism 40 is turned OFF. Reference characteristic curve fa is set so that mean accelerator opening angle decreases along with increasing cumulative travel distance. A hatched control start region AR is defined upward of reference characteristic curve fa.

Figure 10:
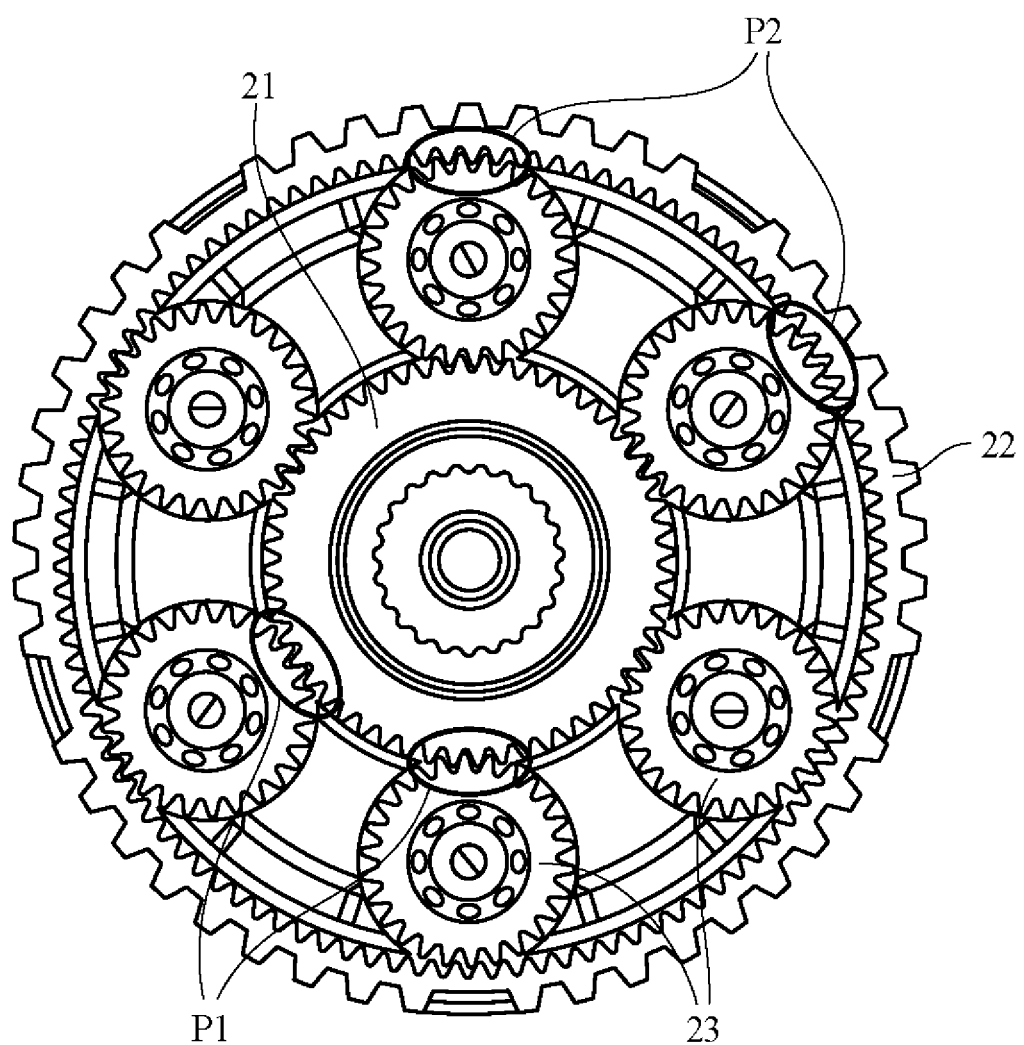
FIG. 10 is a front view of a second planetary gear mechanism in the drive system of FIG. 1.

The mesh shifting determination unit 45 calculates travel distance, by, for example, integrating vehicle speed detected by the vehicle speed sensor 36, i.e., it calculates vehicle travel distance (cumulative travel distance) between time clutch mechanism 40 turned ON and current time. And it uses a signal from the accelerator opening angle sensor 37 to calculate average accelerator opening (mean accelerator opening angle) between time clutch mechanism 40 turned ON and current time. Thereafter, it determines whether a meshing position shifting control is necessary by determining whether operating point dictated by cumulative travel distance and mean accelerator opening angle falls within region AR above reference characteristic curve fa. Determination that operating point falls in region AR amounts to ascertaining that a meshing position shifting control is necessary because a high degree of energy from transmitted torque is acting on the meshing positions P1 and P2 of the gears 21 to 23 (FIG. 10).

When the mesh shifting determination unit 45 determines that meshing position shifting control is necessary, the mesh shifting control unit 46 implements meshing position shifting control. Specifically, it outputs a control signal to the control valve 8a to switch drive mode from HV low mode to HV high mode. This is done by switching the clutch mechanism 40 from ON to OFF and switching the brake mechanism 30 from OFF to ON. Since this cuts off connection between the second sun gear 21 and the second ring gear 22, the second sun gear 21 becomes rotatable relative to the second ring gear 22.

Once this state is established, the mesh shifting control unit 46 outputs control signals to the engine 1 and the power control unit 5 so as to rotate the second carrier 24 and thereby rotate the second sun gear 21 relative to the second ring gear 22. Phase of the meshing zones P1 and P2 of the gears 21 to 23 therefore shifts. Then when the rotational speed sensors 35 and 39 detect that difference of rotational speed of the second sun gear 21 (disks 42) and the second ring gear 22 (plates 41) is greater than 0, i.e., once a rotational speed difference is detected, the mesh shifting control unit 46 outputs a control signal to the control valve 8a to turn ON the clutch mechanism 40 and turn OFF the brake mechanism 30, whereby drive mode is returned to HV low mode. This terminates meshing position shifting control.

Figure 13:
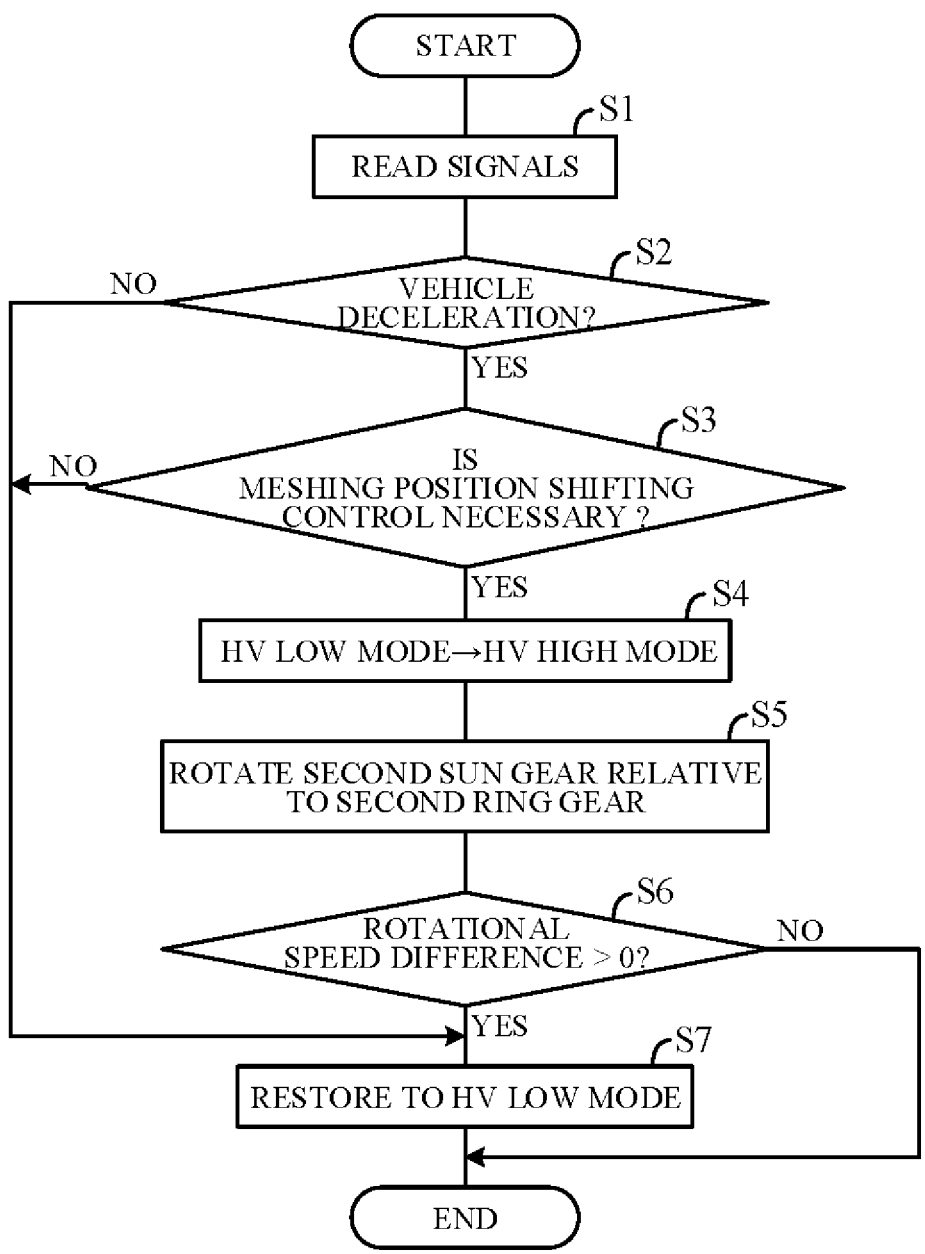
FIG. 13 is a flowchart showing an example of processing performed by a controller of FIG. 11.

FIG. 13 is a flowchart showing an example of processing performed by the CPU of the controller 4 of FIG. 11 in accordance with a program stored in memory in advance. The processing indicated by this flowchart is commenced when sport mode is selected by the mode select switch 38 and is repeatedly performed periodically at predetermined intervals so long as sport mode continues to be selected.

First, in S1 (S: processing Step), signals are read from the sensors 35 to 37 and 39. Next, in S2, a signal from the accelerator opening angle sensor 37 is used to determine whether vehicle deceleration is instructed, e.g., whether accelerator opening angle is 0. Alternatively, presence or absence of deceleration instruction can be determined by using a signal from a sensor for detecting amount of brake pedal depression to determine whether the brake pedal has been operated. If a positive decision is made in S2, the routine proceeds to S3, and if a negative decision is made NO, proceeds to S7.

In S3, signals from the vehicle speed sensor 36 and the accelerator opening angle sensor 37 are used to determine whether meshing positions of the gears 21 to 23 of the second planetary gear mechanism 20 need to be shifted, i.e., whether meshing position shifting control is necessary. This is processing performed by the mesh shifting determination unit 45 to determine whether operating point, dictated by cumulative travel distance and mean accelerator opening angle as pointed out above, falls within control start region AR of FIG. 12. If a positive decision is made in S3, the routine proceeds to S4, and if a negative decision is made, proceeds to S7.

S4 to S7 are processing steps performed by the mesh shifting control unit 46. First, in S4, a control signal is output to the control valve 8a to switch drive mode from HV low mode to HV high mode. More exactly, drive mode switching action is started. Next, in S5, control signals are output to the engine 1 and the power control unit 5 so as to rotate the second sun gear 21 relative to the second ring gear 22. Rotational speed of the second sun gear 21 at this time is kept lower than rotational speed of the second motor-generator 3.

Next, in S6, signals from the rotational speed sensors 35 and 39 are used to determine whether difference of rotational speed between the plates 41 and disks 42 of the clutch mechanism 40, i.e., difference of rotational speed between the second ring gear 22 and second sun gear 21, is greater than 0, in other words, to determine whether relative rotation of the second sun gear 21 occurred. When the result in S6 is YES, the program goes to S7, and when NO, passes S7 and terminates processing. In S7, a control signal is output to the control valve 8a to restore drive mode to HV low mode by turning the clutch mechanism 40 ON and the brake mechanism 30 OFF.

The purpose of the processing of S4 to S7 is to produce difference of rotational speed between the plates 41 and the disks 42, but this can be achieved without need to switch drive mode completely to HV high mode in S4. Therefore, when rotational speed difference is detected in S6, drive mode is immediately returned to HV low mode in S7 before switching to HV high mode is completed.

In the drive system 100 according the embodiment of the present invention, at a time when the mode select switch 38 is switched to sport mode and the vehicle is traveling in HV low mode, should regenerative braking by the second motor-generator 3 be implemented owing to, for example, full release of the accelerator pedal, meshing position shifting control is started (S2 and S3). In the meshing position shifting control, the clutch mechanism 40 is temporarily switched from ON to OFF, and the second sun gear 21 is rotated relative to the second ring gear 22 (S4 and S5).

Since difference of rotational speed therefore arises between the plates 41 and disks 42 of the clutch mechanism 40, phase of the meshing zones P1 and P2 of the gears 21 to 23 can be shifted. Since fatigue strength of the gears 21 to 23 can therefore be enhanced, service life of the drive system 100 can be prolonged even if the vehicle is continuously driven in HV low mode for long periods. Owing to the clutch mechanism 40 being temporarily switched from ON to OFF during regenerative braking in such a case, effect on vehicle running behavior is minimal, and the driver selecting sport mode is therefore likely to experience little unusual feel.

Figure 14:
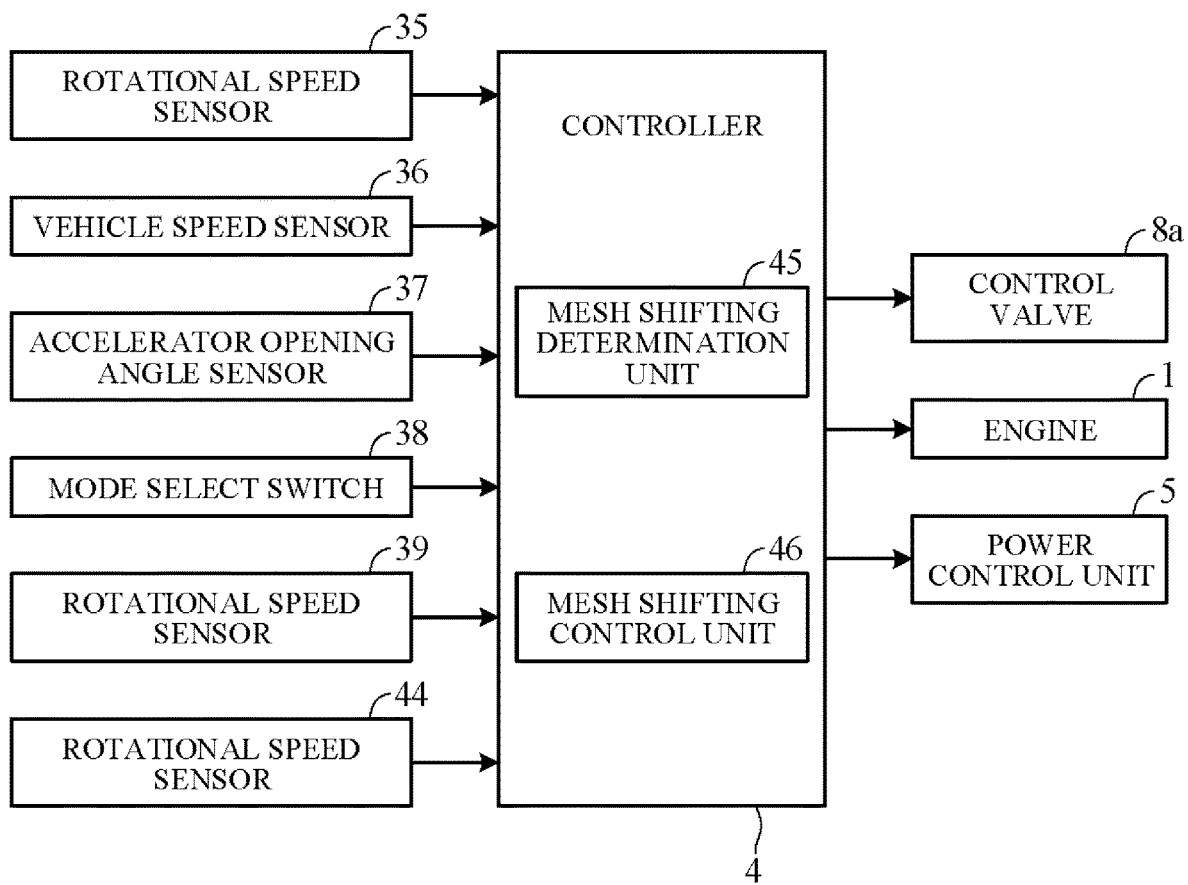
FIG. 14 is a block diagram showing a modification of FIG. 11.

FIG. 14 is a block diagram showing a modification of FIG. 11. The difference between the configurations of FIG. 14 and FIG. 11 is in the make-up of the sensors connected to the controller 4. Specifically, in the arrangement of FIG. 14, a signal from a rotational speed sensor 44 for detecting engine speed is additionally input to controller 4.

Figure 15:
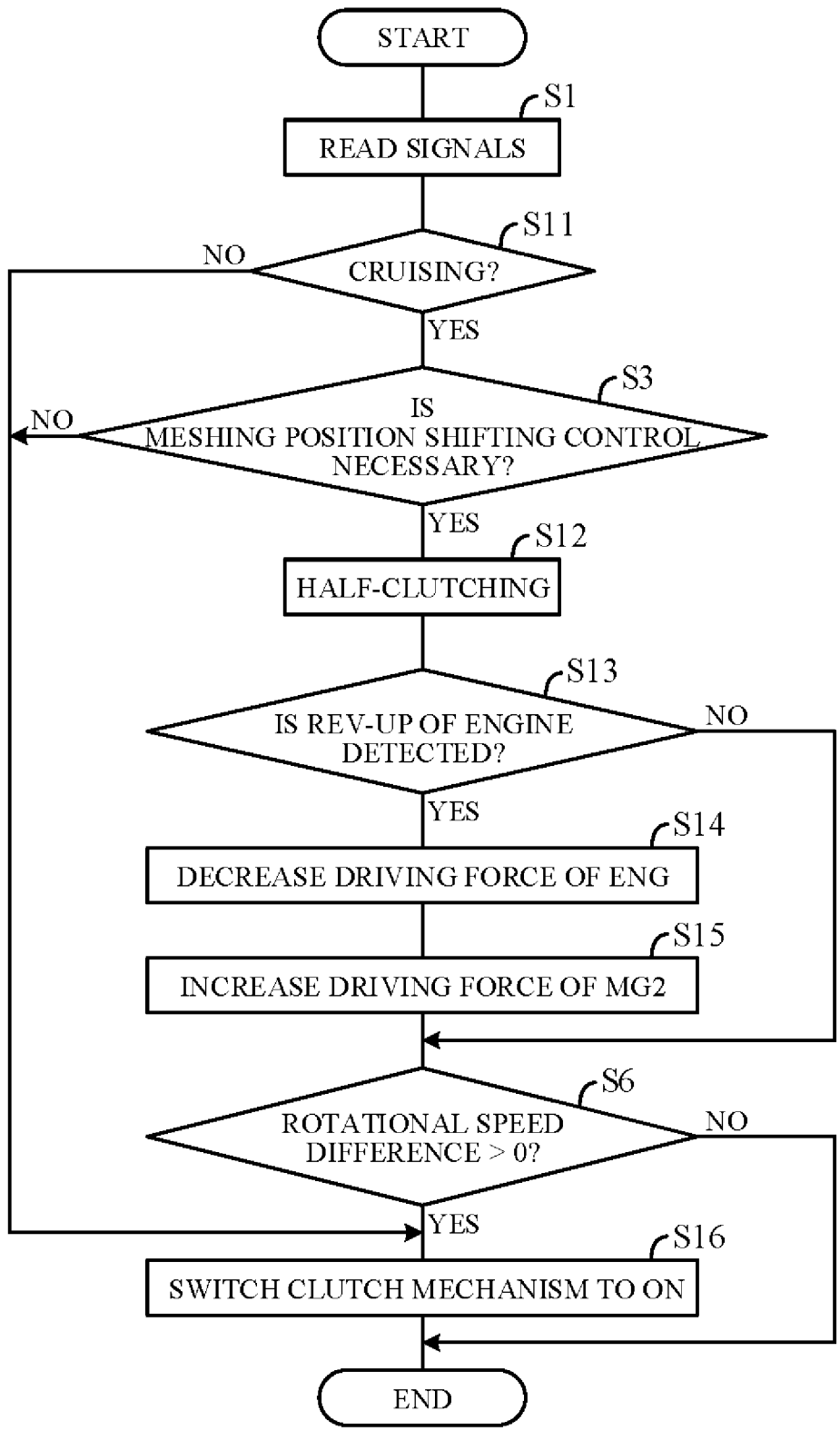
FIG. 15 is a flowchart showing an example of processing performed by a controller of FIG. 14.

FIG. 15 is a flowchart showing an example of processing performed by the controller 4 of FIG. 14. The processing shown in FIG. 15 is a modification of that shown in FIG. 13. In the example of FIG. 13, drive mode is switched from HV low mode to HV high mode during regenerative braking, while in the example of FIG. 15, the clutch mechanism 40 is controlled to partially engaged slipping condition, i.e., half-clutch state, during cruising. In FIG. 15, processing steps the same as or similar to those of FIG. 13 are assigned the same symbols as those in FIG. 13.

As shown in FIG. 15, first, in S1, signals are read from the sensors 35 to 37, 39 and 44. Next, in S11, whether the vehicle is cruising is determined. This is determined by, for example, determining whether accelerator opening angle detected by the accelerator opening angle sensor 37 is equal to or less than predetermined value. Alternatively, whether the vehicle is cruising can be determined by determining whether change of vehicle speed detected by the vehicle speed sensor 36 is equal to or less than predetermined value. If a positive decision is made in S11, the routine proceeds to S3, and if a negative decision is made, proceeds to S16.

In S3, whether meshing position shifting control is necessary is determined, and if a positive decision is made in S3, the routine proceeds to S12. The processing of S12 to S15 is performed by the mesh shifting control unit 46. First, in S12, a control signal is output to the control valve 8a to reduce hydraulic pressure supplied to the piston of the clutch mechanism 40 in order to control the clutch mechanism 40 to half-clutch state. This enables phase shift of the disks 42 relative to the plates 41 of the clutch mechanism 40.

Next, in S13, whether rev-up of the engine 1 is detected is determined using a signal from the rotational speed sensor 44. This is to determine presence or absence of rev-up of the engine 1 that sometimes occurs owing to reduced load on the engine 1 during half-clutching of the clutch mechanism 40 and is performed in S13 by determining whether engine speed increased to or greater than predetermined rotational speed. If a positive decision is made in S13, the routine proceeds to S14, and if a negative decision is made, proceeds to S6.

In S14, driving force of the engine 1 is lowered by outputting a control signal (e.g., to a throttle valve drive motor thereof). This stops rev-up of engine speed. Next, in S15, a control signal is output to the power control unit 5 in order to ensure required vehicle propelling force by increasing driving force of the second motor-generator 3 by an amount equal to decrease in driving force of the engine 1. Next, similarly to in S6 of FIG. 13, whether difference of rotational speed between the plates 41 and disks 42 of the clutch mechanism 40 is greater than 0 is determined. If a positive decision is made in S6, the routine proceeds to S16, in which a signal is output to the control valve 8a to restore the clutch mechanism 40 from half-clutch state to ON state (engaged state).

In the drive system 100 according to the modified version of the present embodiment, meshing position shifting control is started when the vehicle is cruising in HV low mode upon the mode select switch 38 being switched to sport mode (S11 and S3). During the meshing position shifting control, the clutch mechanism 40 is temporarily controlled to half-clutch state (S12). Since this causes difference of rotational speed between the plates 41 and disks 42 of the clutch mechanism 40, it enables phase-shifting of the meshing zones P1 and P2 of the gears 21 to 23. As a result, fatigue strength of the gears 21 to 23 increases, and it is possible to prolong service life of the drive system 100.

When rev-up of the engine 1 occurs during half-clutching of the clutch mechanism 40, driving force of the engine 1 is reduced and driving force of the second motor-generator is increased (S13 to S15). This prevents rev-up of the engine 1 and ensures required vehicle propelling force. In the modified embodiment, it is not necessary to switch drive mode from HV low mode to HV high mode. Therefore, the driver is saved from feeling shift shock.

The present embodiment can achieve advantages and effects such as the following:

(1) The drive system 100 of the hybrid vehicle according to the present embodiment includes: the engine 1 as an internal combustion engine; the first motor-generator 2; the first planetary gear mechanism 10 connected to the engine 1 for dividing and outputting motive power generated by the engine 1 to between the first motor-generator 2 and the first power transmission path 71; the second motor-generator 3 connected to the second power transmission path 72 between the first power transmission path 71 and axles 57; the second planetary gear mechanism 20 that includes the second sun gear 21, the second planetary gears 23 and the second ring gear 22 and is provided in the first power transmission path 71; the clutch mechanism 40 for integrally joining the second sun gear 21 and second ring gear 22 by an engaging action and separating the second sun gear 21 and second ring gear 22 by a disengaging action; the controller 4 that includes the mesh shifting determination unit 45 for determining need to perform meshing position shifting control for shifting meshing positions of the second sun gear 21 and second planetary gears 23 and of the second planetary gears 23 and second ring gear 22, and the mesh shifting control unit 46 for controlling actions of the clutch mechanism 40 in accordance with instructions of drive mode (FIGS. 1, 11 and 14). When the clutch mechanism 40 is engaged by HV low mode instruction, the controller 4 (mesh shifting control unit 46) is responsive to determination by the mesh shifting determination unit 45 of need to perform meshing position shifting control, for temporarily disengaging engagement of the clutch mechanism 40 so as to shift meshing positions of the second sun gear 21 and second planetary gears 23 and of the second planetary gears 23 and second ring gear 22

This makes it possible to change meshing zones of the gears 21 to 23 of the second planetary gear mechanism 20 even in a case where the meshing positions of the gears 21 to 23 are fixed owing to selection of sport mode. Since fatigue strength of the gears 21 to 23 is therefore enhanced, durability of the drive system 100 is improved.

(2) The drive system 100 of the hybrid vehicle further comprises the vehicle speed sensor 36 used to detect travel distance (cumulative travel distance) after the clutch mechanism 40 commences engagement and the accelerator opening angle sensor 37 for detecting accelerator opening angle while the clutch mechanism 40 is engaged (FIGS. 11 and 14). The mesh shifting determination unit 45 determines need for meshing position shifting control based on detected travel distance and accelerator opening angle (FIG. 12). More exactly, meshing position shifting control is determined necessary when operating point dictated by cumulative travel distance and mean accelerator opening angle fall within region AR above the predefined reference characteristic curve fa. Meshing position shifting control can therefore be performed at times suitable in view of degree of cumulative damage to the gears 21 to 23.

(3) The controller 4 of the drive system 100 of the hybrid vehicle determines based on a signal from the accelerator opening angle sensor 37 whether regenerative braking by the second motor-generator 3 is in progress, and when the clutch mechanism 40 is engaged by HV low mode instruction, temporarily disengages the clutch mechanism 40 on condition of determination by the mesh shifting determination unit 45 that meshing position shifting control is needed and, additionally, determination that regenerative braking is in progress (FIG. 13). By temporarily releasing engagement of clutch mechanism 40 during regenerative braking in this manner, unusual sensation felt by the driver owing change in vehicle behavior can be minimized.

(4) The controller 4 of the modified drive system 100 of the hybrid vehicle determines whether the vehicle is cruising, and when the clutch mechanism 40 is engaged by HV low mode instruction, temporarily disengages the clutch mechanism 40 on condition of determination by the mesh shifting determination unit 45 that meshing position shifting control is needed and, additionally, determination that cruising is in progress (FIG. 15). By temporarily releasing engagement of clutch mechanism 40 during vehicle cruising in this manner, control for maintaining constant vehicle propelling force during meshing position shifting control can be easily performed.

(5) The clutch mechanism 40 has frictional engagement elements (the plates 41 and disks 42). The controller 4 of the modified drive system 100 of the hybrid vehicle (its mesh shifting control unit 46) temporarily releases engagement of the clutch mechanism 40 by controlling the clutch mechanism 40 to a partially clutched condition that gives rise to slipping of the frictional engagement elements, i.e., half-clutch state. This enables phase shifting of the meshing zones P1 and P2 of the gears 21 to 23 while holding change in vehicle behavior to the very minimum.

(6) The drive system 100 of the hybrid vehicle according to the present embodiment further includes the brake mechanism 30 for braking the second ring gear 22 by an engaging action and non-braking the second ring gear 22 by a disengaging action (FIG. 1). The controller 4 disengages the brake mechanism 30 and engages the clutch mechanism 40 when HV low mode (first drive mode) is instructed and engages the brake mechanism 30 and disengages the clutch mechanism 40 when HV high mode (second drive mode) is instructed. In addition, when HV low mode is instructed, the controller 4 (its mesh shifting control unit 46) is responsive to need for meshing position shifting control being determined by the mesh shifting determination unit 45, for temporarily switching from state of disengaged brake mechanism 30 and engaged clutch mechanism 40 to state of engaged brake mechanism 30 and disengaged clutch mechanism 40 and thereafter restoring state of disengaged brake mechanism 30 and engaged clutch mechanism 40 (FIG. 13). Since this enables phase shifting of meshing zones of the gears 21 to 23 by switching between HV low mode and HV high mode, i.e., by mode switching within HV mode, the meshing position shifting control causes little vehicle behavior change.

Various modifications of the aforesaid embodiment are possible. Some examples are explained in the following. The aforesaid embodiment is adapted to enable selection of normal mode and sport mode using the mode select switch 38, to fix drive mode in HV low mode in a sport mode selected state, and to perform meshing position shifting control in HV low mode. However, meshing position shifting control can optionally be performed in another drive mode insofar as one in which meshing positions of gears of the planetary gear mechanism assume fixed state. In other words, a predetermined drive mode in which a meshing position shifting control is performed can be one other than HV low mode.

Moreover, meshing position shifting control is not limited to performance in sport mode but can optionally performed similarly also when normal mode is selected or when some other travel mode, such as eco mode, is selected. In such cases, performance of the aforesaid meshing position shifting control is particularly effective in a drive system in which switching between HV low mode and HV high mode is not performed automatically in response to accelerator pedal operation but is performed in response to a certain drive mode arbitrarily set by the driver by switch operation, voice command or the like, and HV low mode and HV high mode are switched in accordance with the set drive mode. Optionally, meshing position shifting control can be periodically performed when a predetermined drive mode is selected. The present invention can be similarly applied to a drive system not equipped with the mode select switch 38 for manually switching a travel mode.

The aforesaid embodiment is adapted to shift phase of the meshing zones P1 and P2 of the gears 21 to 23 by temporarily switching the clutch mechanism 40 from ON to OFF or by temporarily controlling the clutch mechanism 40 to half-clutch state. However, processing performed by the controller 4 serving as an electronic control unit is not limited to the aforesaid insofar as it temporarily releases engagement of the clutch mechanism so as to shift meshing positions of gears of the planetary gear mechanism provided in a power transmission path. In the aforesaid embodiment, the clutch mechanism 40 is configured using frictional engagement elements, but structure of the clutch mechanism is not limited to the aforesaid and can instead utilize band brake, dog or some other type of engagement elements. In the aforesaid embodiment, the first planetary gear mechanism 10 is adapted to divide motive power generated by the engine 1 to the first motor-generator 2 and the second carrier 24 of the first power transmission path 71. However, a power division mechanism is not limited to this configuration.

In the aforesaid embodiment, travel distance after the clutch mechanism 40 commences engagement is detected from the vehicle speed sensor 36. However, a first detector for detecting travel distance and time elapsed after the clutch mechanism commences engagement is not limited to this configuration. In the aforesaid embodiment, required driving force is detected using the accelerator opening angle sensor 37. However, a second detector for detecting required driving force when the clutch mechanism is engaged is not limited to this configuration. In the aforesaid embodiment, difference of rotational speed of the plates 41 and the disks 42, namely, difference of rotational speed of the second ring gear 22 and the second sun gear 21, is detected using signals from the rotational speed sensors 35 and 39. However, a speed difference detector is not limited to this configuration. In the aforesaid embodiment, the clutch mechanism 40 is re-engaged when detected rotational speed difference is greater than 0 (predetermined value) (when rotational speed difference is detected), but the predetermined value can be a value greater than 0. In the aforesaid embodiment, the mesh shifting determination unit 45 determines need for meshing position shifting control based on reference characteristic curve fa. However, a shifting determination unit is not limited to this configuration. In the aforesaid embodiment, whether regenerative braking or cruising is in progress is determined, presuming meshing position shifting control is to be performed, based on a signal from the accelerator opening angle sensor 37 or the vehicle speed sensor 36. However, a regenerating determination unit and a cruising determination are not limited to this configuration.

The above embodiment can be combined as desired with one or more of the above modifications. The modifications can also be combined with one another.

According to the present invention, even in a drive mode that gears of a planetary gear mechanism are integrally coupled, it is possible to shift meshing positions of the gears of the planetary gear mechanism. Therefore, it is possible to increase fatigue strength of the gears and to prolong service life of a drive system.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
an internal combustion engine;
a first motor-generator;
a first power transmission path and a second power transmission path connected with each other in series;
a power division mechanism connected to the internal combustion engine to divide a power generated by the internal combustion engine to the first motor-generator and the first power transmission path;
a second motor-generator connected to the second power transmission path;
a planetary gear mechanism provided in the first power transmission path and including a sun gear, a planetary gear and a ring gear;
a clutch mechanism configured to integrally join or separate the sun gear and the ring gear by engaging or disengaging in accordance with an instruction of a drive mode; and
an electronic control unit including a microprocessor and a memory, wherein
the microprocessor is configured to perform
determining whether it is necessary to perform a meshing position shifting control shifting a first meshing position of the sun gear and the planetary gear and a second meshing position of the planetary gear and the ring gear,
controlling the clutch mechanism in accordance with the instruction of the drive mode, and
the controlling including temporarily disengaging the clutch mechanism so as to shift the first meshing position and the second meshing position, when the meshing position shifting control is determined to be performed while the clutch mechanism is engaged under an instruction of a predetermined drive mode, and
the microprocessor is further configured to perform
determining whether a regenerative braking by the second motor-generator is implemented, and
the controlling including temporarily disengaging the clutch mechanism, when the meshing position shifting control is determined to be performed and the regenerative braking is determined to be implemented while the clutch mechanism is engaged under the instruction of the predetermined drive mode.

2. The drive system according to claim 1, further comprising:
a vehicle speed sensor configured to detect a vehicle speed; and
an accelerator opening angle sensor configured to detect an accelerator opening angle in accordance with an operation amount of an accelerator pedal while the clutch mechanism is engaged, wherein
the microprocessor is configured to perform
calculating a travel distance from a start of engaging of the clutch mechanism based on the vehicle speed detected by the vehicle speed sensor, and
the determining including determining whether there is the need to perform the meshing position shifting control based on the travel distance calculated and the accelerator opening angle detected by the accelerator opening angle sensor.

3. The drive system according to claim 1, wherein
the clutch mechanism includes friction engagement elements, and
the microprocessor is configured to perform
the controlling including controlling the clutch mechanism to a half-clutch state in which the friction engagement elements are slipped, when the clutch mechanism is temporarily disengaged.

4. The drive system according to claim 3, further comprising
a speed detector configured to detect a rotational speed of the internal combustion engine, wherein
the microprocessor is configured to perform
controlling the internal combustion engine and the second motor-generator so as to decrease a driving force of the internal combustion engine and increase a driving force of the second motor-generator, when the rotational speed detected by the speed detector is greater than or equal to a predetermined speed after the clutch mechanism is controlled to the half-clutch state.

5. The drive system according to claim 1, further comprising
a brake mechanism configured to brake or non-brake the ring gear by engaging or disengaging in accordance with the instruction of the drive mode, wherein
the microprocessor is configured to perform
controlling the brake mechanism, and
the controlling including the brake mechanism and the clutch mechanism so as to disengage the brake mechanism and engage the clutch mechanism when a first drive mode as the predetermined drive mode is instructed, so as to engage the brake mechanism and disengage the clutch mechanism when a second drive mode different from the predetermined drive mode is instructed, and so as to temporarily engage the brake mechanism and disengage the clutch mechanism when the meshing position shifting control is determined to be performed while the first drive mode is instructed.

6. The drive system according to claim 1, further comprising
a speed difference detector configured to detect a rotational speed difference between a rotational speed of the sun gear and a rotational speed of the ring gear, wherein
the microprocessor is configured to perform
the controlling including engaging the clutch mechanism again when the rotational speed difference detected by the speed difference detector is greater than or equal to a predetermined value, in a state that the clutch mechanism is temporarily disengaged after the meshing position shifting control is determined to be performed.

7. A drive method of a hybrid vehicle, the hybrid vehicle including: an internal combustion engine; a first motor-generator; a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a planetary gear mechanism provided in the first power transmission path and including a sun gear, a planetary gear and a ring gear; and a clutch mechanism configured to integrally join or separate the sun gear and the ring gear by engaging or disengaging in accordance with an instruction of a drive mode;

the drive method comprising:
determining whether there is a need to perform a meshing position shifting control shifting a first meshing position of the sun gear and the planetary gear and a second meshing position of the planetary gear and the ring gear; and
controlling the clutch mechanism in accordance with the instruction of the drive mode, wherein
the controlling includes temporarily disengaging the clutch mechanism so as to shift the first meshing position and the second meshing position, when the meshing position shifting control is determined to be performed while the clutch mechanism is engaged under an instruction of a predetermined drive mode,
the drive method further comprises determining whether a regenerative braking by the second motor-generator is implemented, and
the controlling includes temporarily disengaging the clutch mechanism, when the meshing position shifting control is determined to be performed and the regenerative braking is determined to be implemented while the clutch mechanism is engaged under the instruction of the predetermined drive mode.

* * * * *